(12) United States Patent
Kato

(10) Patent No.: US 11,299,608 B2
(45) Date of Patent: Apr. 12, 2022

(54) THERMOPLASTIC RESIN COMPOSITION, METHOD FOR PRODUCING SAME AND MOLDED BODY

(71) Applicant: TOYOTA BOSHOKU KABUSHIKI KAISHA, Aichi (JP)

(72) Inventor: Keisuke Kato, Kariya (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/330,400

(22) PCT Filed: Jan. 19, 2018

(86) PCT No.: PCT/JP2018/001683
§ 371 (c)(1),
(2) Date: Mar. 5, 2019

(87) PCT Pub. No.: WO2018/135648
PCT Pub. Date: Jul. 26, 2018

(65) Prior Publication Data
US 2020/0216648 A1 Jul. 9, 2020

(30) Foreign Application Priority Data
Jan. 23, 2017 (JP) .............................. JP2017-009789

(51) Int. Cl.
| C08L 23/08 | (2006.01) |
| C08L 23/14 | (2006.01) |
| C08L 25/04 | (2006.01) |
| C08L 77/00 | (2006.01) |
| C08K 3/36 | (2006.01) |

(52) U.S. Cl.
CPC .......... *C08L 23/0815* (2013.01); *C08L 23/14* (2013.01); *C08L 25/04* (2013.01); *C08L 77/00* (2013.01); *C08K 3/36* (2013.01); *C08L 2207/04* (2013.01)

(58) Field of Classification Search
CPC ........................ C08L 2205/03; C08L 2207/02
See application file for complete search history.

(56) References Cited

U.S. PATENT DOCUMENTS

| 5,073,590 | A | 12/1991 | Abe et al. |
| 5,091,462 | A | 2/1992 | Fukui et al. |
| 5,206,284 | A | 4/1993 | Fukui et al. |
| 5,449,722 | A | 9/1995 | Nishida et al. |
| 5,648,424 | A | 7/1997 | Miwa et al. |
| 9,493,642 | B2 | 11/2016 | Kito et al. |
| 2002/0198321 | A1 | 12/2002 | Nakamura |
| 2012/0214943 | A1 | 8/2012 | Sato et al. |
| 2014/0364569 | A1 | 12/2014 | Kito et al. |
| 2014/0371394 | A1 | 12/2014 | Kito et al. |

FOREIGN PATENT DOCUMENTS

| CN | 1098119 | | 2/1995 |
| CN | 102286200 | | 12/2011 |
| CN | 102575020 | | 7/2012 |
| CN | 103205122 | | 7/2013 |
| CN | 103788634 | | 5/2014 |
| CN | 105273413 | A | 1/2016 |
| CN | 105330975 | A * | 2/2016 |
| EP | 0472344 | | 2/1992 |
| JP | 3-014854 | | 1/1991 |
| JP | 4-183733 | | 6/1992 |
| JP | H11-12459 | | 1/1999 |
| JP | 2001-226538 | | 8/2001 |
| JP | 4078854 | | 4/2008 |
| JP | 2013-147645 | | 8/2013 |
| JP | 2013-147646 | | 8/2013 |
| JP | 2013-147647 | | 8/2013 |
| JP | 2017-226765 | | 12/2017 |
| WO | 2018/021569 | | 2/2018 |

OTHER PUBLICATIONS https://eng.libretexts.org/Bookshelves/Materials-Science/Supplemental-Modules (May 2020).*
Hao Yanzhi, "Comparative Study on Properties of Polyolefin Blends Modified PA6", Masterchar (39)s Degree Thesis of Nanjing Agricultural University, pp. 14-15, Aug. 15, 2015, with English translation thereof.*
CN 105330975 A machine translation.*
International Search Report in International Application No. PCT/JP2018/001683, dated Apr. 17, 2018.
Office Action, Indian Patent Office, Application No. 201917002089, dated Jan. 9, 2020, with English translation.
Korean Office Action of corresponding Korean Application No. 10-2019-7010134 dated Jun. 24, 2019 (along with its English machine translation).

(Continued)

*Primary Examiner* — Ana L. Woodward
(74) *Attorney, Agent, or Firm* — Greenblum & Bernstein, P.L.C.

(57) ABSTRACT

Disclosed is a thermoplastic resin composition designed to, even when containing a filler, reduce a trade-off between stiffness and impact resistance to achieve a balance between impact resistance and stiffness, a method for producing the same, and a molded body. The thermoplastic resin composition is obtained by blending a polyolefin resin, a polyamide resin containing an inorganic filler, and a modified elastomer having a reactive group that reacts with the polyamide resin, wherein the polyolefin resin has a number-average molecular weight of 350,000 or more, and the polyamide resin has a structure in which a hydrocarbon group interposed between adjacent amide bonds in a main chain has 5 or less straight chain carbon atoms. The molded body is composed of the thermoplastic resin composition. The method for producing the thermoplastic resin composition includes melt-kneading a polyolefin resin and a melt-kneaded product of a polyamide resin and a modified elastomer.

7 Claims, 1 Drawing Sheet

(56) References Cited

OTHER PUBLICATIONS

Chinese Office Action of the corresponding Chinese Application No. 201880003959.7, dated Aug. 12, 2019, along with English machine translation.
Extended European Search Report of corresponding European Application No. 18742254.8, dated Oct. 1, 2020.
Office Action issued in corresponding Indian Application No. 201917002089, dated Feb. 8, 2021.
Tzoganakis C. et al., "Effect of molecular weight distribution on the rheological and mechanical properties of polypropylene", *Polymer Engineering and Science*, vol. 29, No. 6, Mar. 1, 1989, pp. 390-396.
Office Action issued in corresponding European Application No. 18742254.8, dated Aug. 27, 2021.

\* cited by examiner

[FIG.1]
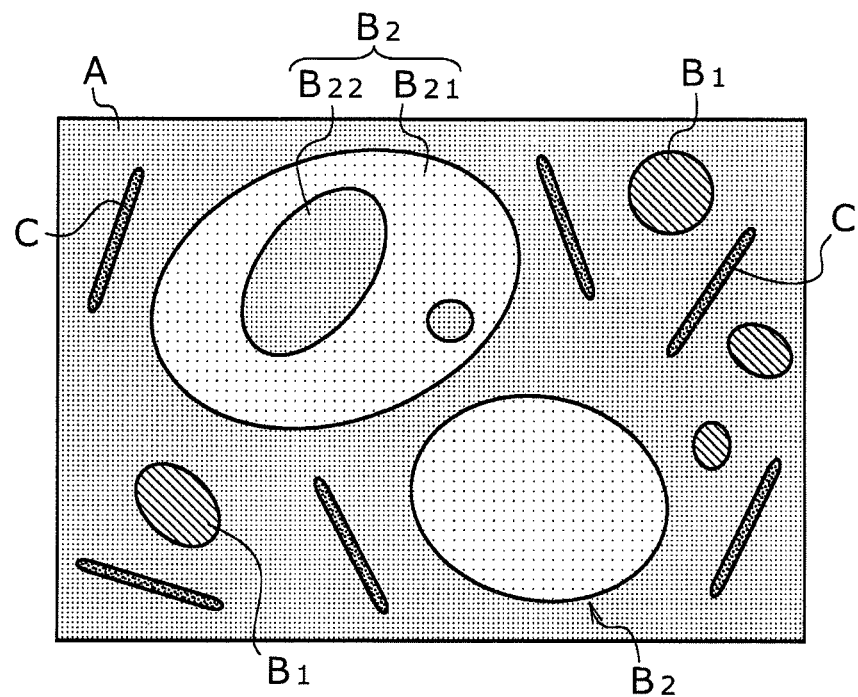
[FIG.2]
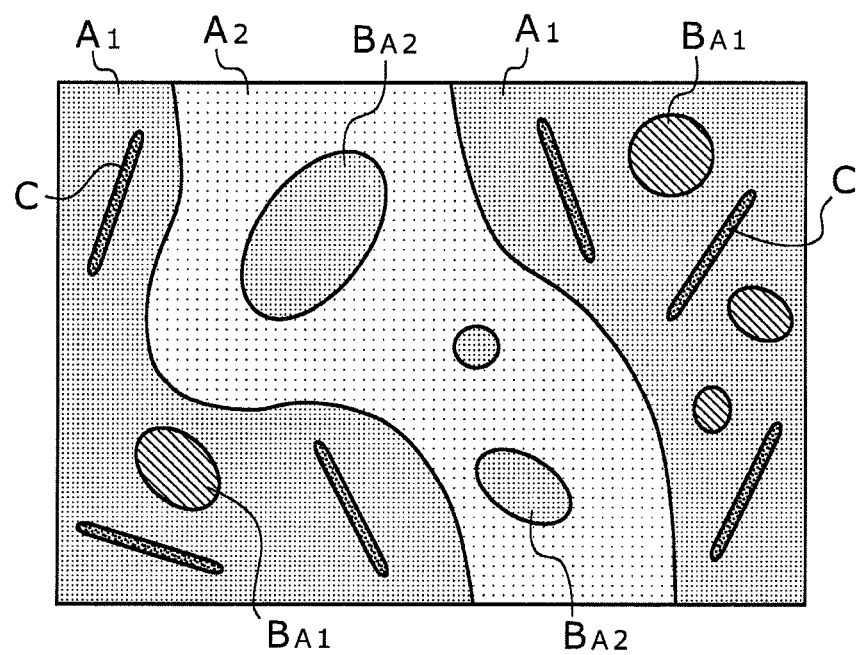

THERMOPLASTIC RESIN COMPOSITION, METHOD FOR PRODUCING SAME AND MOLDED BODY

TECHNICAL FIELD

The present invention relates to a thermoplastic resin composition, a method for producing the same, and a molded body. More specifically, the present invention relates to a thermoplastic resin composition that can achieve both excellent impact resistance and excellent stiffness, a method for producing the same, and a molded body.

BACKGROUND ART

Attempts have heretofore been made to mix raw material resins different in property to obtain a resin composition (polymer blend, polymer alloy) that offers a synergistic property exceeding the property of each of the raw material resins. For example, it is known that when a polyolefin resin and a polyamide resin that are poorly compatible with each other are selected as raw material resins and mixed together to obtain a resin composition having a multi-phase structure (e.g., a continuous phase and a dispersed phase), the resin composition sometimes has impact resistance higher than that of each of the raw material resins. Such a technique is disclosed in the following Patent Literatures 1 to 3. Further, Patent Literature 4 discloses a technique in which polypropylene is blended with a clay mineral-modified polyamide.

CITATIONS LIST

Patent Literatures

Patent Literature 1: JP-A-2013-147647
Patent Literature 2: JP-A-2013-147646
Patent Literature 3: JP-A-2013-147645
Patent Literature 4: JP-A-H4-183733

SUMMARY OF INVENTION

Technical Problems

Patent Literatures 1 to 3 described above disclose a thermoplastic resin composition that is obtained by blending a polyolefin resin, a polyamide resin, and a compatibilizer and that has a three-phase separated structure including a continuous phase, a dispersed phase, and a fine dispersed phase. Further, Patent Literatures 1 to 3 disclose that such a thermoplastic resin composition having a three-phase separated structure can offer excellent mechanical properties. Patent Literatures 1 to 3 disclose that when PA11 is used as the polyamide resin, particularly excellent properties can be achieved, but when another polyamide resin such as PA6 is used, there is a case where properties comparable to those when PA11 is used are not achieved.

Further, Patent Literature 4 discloses that when polypropylene is blended with a clay mineral-modified polyamide, a polypropylene composition having excellent mechanical properties can be obtained. However, the polypropylene composition does not have mechanical properties (especially, impact resistance) comparable to those disclosed in Patent Literatures 1 to 3, and a higher level property balance is recently required.

As described above, there is a problem that when a certain raw material polyamide is used to obtain a thermoplastic resin composition, there is a case where it is difficult for the thermoplastic resin composition to stably achieve high mechanical properties (impact resistance, stiffness) unlike when PA11 is used, and therefore the thermoplastic resin composition has lower mechanical properties. Further, when the stiffness (elastic modulus) of a thermoplastic resin composition using such a raw material polyamide is improved by adding an inorganic filler, there is a problem that impact resistance is reduced, that is, a trade-off between stiffness and impact resistance occurs.

Under the circumstances, it is an object of the present invention to provide a thermoplastic resin composition that is obtained by blending a polyolefin resin, a polyamide resin containing an inorganic filler, and a modified elastomer having a reactive group that reacts with the polyamide resin and that is designed to, even when containing a filler, reduce a trade-off between stiffness and impact resistance as compared with a thermoplastic resin composition containing no filler to achieve a good balance between impact resistance and stiffness, a method for producing the same, and a molded body.

Solutions to Problems

The present inventor focused attention on the fact that, as described above, particularly when PA11 that is one of raw material polyamides is used, an extremely excellent impact resistance-improving effect can be obtained, whereas when PA6 that is also one of raw material polyamides is used, impact resistance-improving effect is difficult to obtain. Further, the present inventor focused attention on the fact that the number of straight chain carbon atoms of a hydrocarbon group interposed between adjacent amide bonds in the main chain of PA11 is as large as 10, whereas that of PA6 is as small as 5. The present inventor considered that the reason why impact resistance-improving effect is difficult to obtain is that PA6 has a short chain structure whose number of carbon atoms between amide bonds is small, and therefore the dispersion diameter of the dispersed phase in the continuous phase cannot be made small during melt kneading due to a large number of amide bonds contained in a polyamide molecule and a strong hydrogen bonding strength between the molecules. The present inventor reached the idea that in this case, mechanical properties may be improved by reducing the interface between molecules of the polyolefin resin, that is, by polymerizing the polyolefin resin (raw material polyolefin).

Further, the present inventor actually produced such a thermoplastic resin composition, and found that it has a new property. More specifically, when a filler is added to a thermoplastic resin composition obtained using a raw material polyolefin not polymerized, PA6 (raw material polyamide), and a modified elastomer, in general, stiffness is increased but impact resistance is reduced, that is, a trade-off between stiffness and impact resistance occurs. However, the present inventor found that as described above, when a thermoplastic resin composition is obtained using a high-molecular-weight raw material polyolefin, a trade-off between stiffness and impact resistance does not occur even when a filler is added. This finding has led to the completion of the present invention.

In order to achieve the above object, the present invention provides the following.

The invention according to one aspect is a thermoplastic resin composition (hereinafter also simply referred to as "first composition") obtained by blending a polyolefin resin, a polyamide resin containing an inorganic filler, and a modified elastomer having a reactive group that reacts with the polyamide resin, wherein the polyolefin resin has a number-average molecular weight of 350,000 or more, and the polyamide resin has a structure in which a hydrocarbon group interposed between adjacent amide bonds in a main chain has 5 or less straight chain carbon atoms.

The invention according to another aspect is a thermoplastic resin composition (hereinafter also simply referred to as "second composition") comprising a polyolefin resin, a polyamide resin containing an inorganic filler, and a modified elastomer having a reactive group that reacts with the polyamide resin, wherein the polyolefin resin has a number-average molecular weight of 350,000 or more, and the polyamide resin has a structure in which a hydrocarbon group interposed between adjacent amide bonds in a main chain has 5 or less straight chain carbon atoms.

The invention according to yet another aspect is the thermoplastic resin composition, wherein the polyamide resin is contained in a continuous phase (A), the modified elastomer is contained in a dispersed phase ($B_1$) dispersed in the continuous phase (A), the polyolefin resin is contained in a dispersed phase ($B_2$) dispersed in the continuous phase (A), and the inorganic filler (C) is dispersed in the continuous phase (A).

The invention according to one aspect is the thermoplastic resin composition, wherein the inorganic filler is a layered silicate.

The invention according to another aspect is the thermoplastic resin composition, wherein the polyolefin resin is a homopolymer.

The invention according to yet another aspect is the thermoplastic resin composition, wherein the polyamide resin is selected from the group consisting of nylon 6, nylon 66, nylon 46, nylon 6T, nylon 6I, nylon M5T, nylon M5I, and copolymers of two or more of them.

The invention according to one aspect is the thermoplastic resin composition, wherein the modified elastomer is an olefin-based thermoplastic elastomer having, as a skeleton, a copolymer of ethylene or propylene and an α-olefin having 3 to 8 carbon atoms or a styrene-based thermoplastic elastomer having a styrene skeleton.

The invention according to another aspect is a molded body comprising the thermoplastic resin composition.

The invention according to yet another aspect is a method for producing the thermoplastic resin composition, comprising melt-kneading the polyolefin resin and a melt-kneaded product of the polyamide resin containing an inorganic filler and the modified elastomer.

Advantageous Effects of Invention

According to the present invention, it is possible to provide a thermoplastic resin composition (first composition or second composition) comprising a polyolefin resin, a polyamide resin containing an inorganic filler, and a modified elastomer. The thermoplastic resin composition is designed to, when the polyamide resin has a short chain structure whose number of straight chain carbon atoms between amide bonds is 5 or less, reduce a trade-off between stiffness and impact resistance even when containing the inorganic filler to achieve a good balance between impact resistance and stiffness.

According to the present invention, it is also possible to provide a molded body comprising a thermoplastic resin composition comprising a polyolefin resin, a polyamide resin containing an inorganic filler, and a modified elastomer. The molded body is designed to, when the polyamide resin has a short chain structure whose number of straight chain carbon atoms between amide bonds is 5 or less, reduce a trade-off between stiffness and impact resistance even when containing the inorganic filler to achieve a good balance between impact resistance and stiffness.

According to the method for producing a thermoplastic resin composition of the present invention, it is possible to obtain the above-described thermoplastic resin composition.

BRIEF DESCRIPTION OF DRAWINGS

The present invention will further be described in detail below based on non-limiting examples of exemplary embodiments according to the present invention with reference to the drawings in which the same reference numerals denote the same components.

FIG. 1 is a schematic diagram for explaining one example of the phase structure of a thermoplastic resin composition according to the present invention.

FIG. 2 is a schematic diagram for explaining another example of the phase structure of the thermoplastic resin composition according to the present invention.

DESCRIPTION OF EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

[1] Thermoplastic Resin Composition

The first composition is obtained by blending a polyolefin resin, a polyamide resin containing an inorganic filler (hereinafter also referred to as "inorganic filler-containing polyamide resin"), and a modified elastomer having a reactive group that reacts with the polyamide resin. A polyamide resin constituting the inorganic filler-containing polyamide resin has a structure in which a hydrocarbon group interposed between adjacent amide bonds in a main chain has 5 or less straight chain carbon atoms. The polyolefin resin has a number-average molecular weight of 350,000 or more.

The second composition contains a polyolefin resin, a polyamide resin containing an inorganic filler (hereinafter also referred to as "inorganic filler-containing polyamide resin"), and a modified elastomer having a reactive group that reacts with the polyamide resin. The polyolefin resin has a number-average molecular weight of 350,000 or more. Further, the polyamide resin has a structure in which a hydrocarbon group interposed between adjacent amide bonds in a main chain has 5 or less straight chain carbon atoms.

It is to be noted that when particulars common to the "first composition" and the "second composition" are described, the "first composition" and the "second composition" are simply represented as "thermoplastic resin composition".

<1> Components
(1) Polyolefin Resin

The polyolefin resin is an olefin homopolymer and/or an olefin copolymer. An olefin constituting the polyolefin resin is not particularly limited, and examples thereof include ethylene, propylene, 1-butene, 3-methyl-1-butene, 1-pentene, 3-methyl-1-pentene, 4-methyl-1-pentene, 1-hexene, and 1-octene. These olefins may be used singly or in combination of two or more of them.

That is, examples of the polyolefin resin include a polyethylene resin, a polypropylene resin, poly(1-butene), poly(1-hexene), and poly(4-methyl-1-pentene). These polymers may be used singly or in combination of two or more of them. That is, the polyolefin resin may be a mixture of two or more of the above-mentioned polymers.

Examples of the polyethylene resin include an ethylene homopolymer and a copolymer of ethylene and another olefin. Examples of the latter include an ethylene-1-butene copolymer, an ethylene-1-hexene copolymer, an ethylene-1-octene copolymer, and an ethylene-4-methyl-1-pentene copolymer (50% or more of all the structural units are derived from ethylene).

Examples of the polypropylene resin include a propylene homopolymer and a copolymer of propylene and another olefin.

Examples of the another olefin constituting the copolymer of propylene and another olefin include the above-mentioned various olefins (except for propylene). Among them, ethylene and 1-butene or the like are preferred. That is, a propylene-ethylene copolymer and a propylene-1-butene copolymer are preferred.

Further, the copolymer of propylene and another olefin may be a random copolymer or a block copolymer.

It is to be noted that 50% or more of all the structural units of the copolymer of propylene and another olefin are derived from propylene.

In the thermoplastic resin composition, the polyolefin resin preferably contains a homopolymer, and more preferably contains a homopolymer as a main component (the homopolymer content is usually 70% by mass or more and may be 100% by mass when the total mass of the polyolefin resin is taken as 100%). That is, the polyolefin resin is preferably a homopolymer containing, as a monomer, one of olefins such as ethylene, propylene, 1-butene, 3-methyl-1-butene, 1-pentene, 3-methyl-1-pentene, 4-methyl-1-pentene, 1-hexene, and 1-octene, or a mixture of two or more of the homopolymers. Particularly, the polyolefin resin preferably contains a polypropylene homopolymer, and more preferably contains a propylene homopolymer as a main component (the propylene homopolymer content is usually 70% by mass or more and may be 100% by mass when the total mass of the polyolefin resin is taken as 100%).

When the polyolefin resin contains a homopolymer as a main component, and the homopolymer is a propylene homopolymer, the polyolefin resin may contain a homopolymer other than the propylene homopolymer, such as an ethylene homopolymer and/or a 1-butene homopolymer.

It is to be noted that the polyolefin resin is a polyolefin having no affinity for the polyamide resin and no reactive group that is reactive with the polyamide resin. The polyolefin resin is different from the modified elastomer in this point.

The polyolefin resin contained in the thermoplastic resin composition has a number-average molecular weight of 350,000 or more. When the number-average molecular weight of the polyolefin resin is 350,000 or more, the interface between polyolefin molecules can be reduced. It is considered that this makes it possible to significantly improve impact resistance even when the dispersion diameter of a dispersed phase (e.g., a dispersed phase $B_2$ shown in FIG. 1) remains relatively large. This effect is not produced when a polyamide resin, such as PA11, whose number of straight chain carbon atoms between amide bonds is large is selected, but is specifically produced only when a polyamide resin whose number of straight chain carbon atoms between amide bonds is small is selected.

In the thermoplastic resin composition, the above-described number-average molecular weight is not particularly limited as long as it is 350,000 or more. The upper limit of the number-average molecular weight is not particularly limited, but may be, for example, 700,000 or less. The number-average molecular weight is preferably 370,000 or more, more preferably 400,000 or more, even more preferably 430,000 or more, even more preferably 450,000 or more, particularly preferably 470,000 or more, more particularly preferably 490,000 or more, even more particularly preferably 500,000 or more.

It is to be noted that the number-average molecular weight of the polyolefin resin is determined by gel permeation chromatography (GPC) using polystyrene standards. In the present invention, when a homopolymer is used as the polyolefin resin, the numerical ranges of the above-described number-average molecular weight can be respectively read as those of a weight-average molecular weight.

The MFR (melt flow rate) of the polyolefin resin contained in the thermoplastic resin composition is not particularly limited. Usually, the molecular weight (including the number-average molecular weight) and MFR of the polyolefin resin are in a proportional relationship. The MFR of the polyolefin resin contained in the thermoplastic resin composition is preferably 25 g/10 min or less. The lower limit of the MFR is not particularly limited, but may be, for example, 1 g/10 min or more. The MFR is preferably 22 g/10 min or less, more preferably 19 g/10 min or less, even more preferably 16 g/10 min or less, even more preferably 13 g/10 min or less, particularly preferably 10 g/10 min or less, more particularly preferably 9 g/10 min or less, even more particularly preferably 8 g/10 min or less.

It is to be noted that the MFR of the polyolefin resin is measured in accordance with JIS K 7210 under conditions of a temperature of 230° C. and a load of 21.18 N (2.16 kgf).

(2) Polyamide Resin

The polyamide resin used in the thermoplastic resin composition is used as a polyamide resin containing an inorganic filler (i.e., as a polyamide resin composition containing an inorganic filler). The polyamide resin composition containing an inorganic filler may be any one of the following (1) to (3):

(1) a polyamide resin composition in which an inorganic filler is dispersed in advance (e.g., a composition obtained by polymerizing a monomer (one or two or more kinds of monomers), which is polymerized to form a polyamide, in a state where an inorganic filler and the monomer coexist);

(2) a mixture of the above-described polyamide resin composition (1) in which an inorganic filler is dispersed in advance and a polyamide resin containing no inorganic filler (e.g., a composition obtained by melt-kneading the above-described polyamide resin composition (1) in which an inorganic filler is dispersed in advance and a polyamide resin containing no inorganic filler); and (3) a mixture of a polyamide resin containing no inorganic filler and an inorganic filler (e.g., a composition obtained by melt-kneading a polyamide resin containing no inorganic filler and an inorganic filler).

These polyamide resins (1) to (3) may be used singly or in combination of two or more of them. Among the above-described polyamide resins (1) to (3), the polyamide resin (1) or the polyamide resin (2) is preferred as the polyamide resin used in the thermoplastic resin composition.

When the polyamide resin (2) is used, the thermoplastic resin composition can be said as a thermoplastic resin composition obtained by blending a polyolefin resin, a polyamide resin composition containing an inorganic filler, a polyamide resin containing no inorganic filler, and a modified elastomer having a reactive group that reacts with a polyamide resin constituting the polyamide resin composition and/or a polyamide resin constituting the polyamide resin containing no inorganic filler, wherein the polyolefin resin has a number-average molecular weight of 350,000 or more, and the polyamide resin has a structure in which a hydrocarbon group interposed between adjacent amide bonds in a main chain has 5 or less straight chain carbon atoms.

The polyamide resin is a polymer having a chain skeleton obtained by polymerizing a plurality of monomers via amide bonds (—NH—CO—).

The polyamide resin contained in the thermoplastic resin composition has a structure in which a hydrocarbon group interposed between adjacent amide bonds in a main chain has 5 or less straight chain carbon atoms (in the present invention, simply referred to as "short chain structure"). That is, polyamide molecules constituting the polyamide resin have a short chain structure.

Examples of the above-described structure having 5 straight chain carbon atoms include the following (1) to (6).
(1) —NHCO—CH$_2$—CH$_2$—CH$_2$—CH$_2$—CH$_2$—NHCO—
(2) —CONH—CH$_2$—CH$_2$—CH$_2$—CH$_2$—CH$_2$—NHCO—
(3) —NHOC—CH$_2$—CH$_2$—CH$_2$—CH$_2$—CH$_2$—CONH—
(4) —NHCO—CH$_2$—CH$_2$—CH$_2$—CH$_2$(CH$_3$)—CH$_2$—NHCO—
(5) —CONH—CH$_2$—CH$_2$—CH$_2$—CH$_2$(CH$_3$)—CH$_2$—NHCO—
(6) —NHOC—CH$_2$—CH$_2$—CH$_2$—CH$_2$(CH$_3$)—CH$_2$—CONH—

Examples of the above-described structure having 4 straight chain carbon atoms include the following (7) to (12).
(7) —NHCO—CH$_2$—CH$_2$—CH$_2$—CH$_2$—NHCO—
(8) —CONH—CH$_2$—CH$_2$—CH$_2$—CH$_2$—NHCO—
(9) —NHOC—CH$_2$—CH$_2$—CH$_2$—CH$_2$—CONH—
(10) —NHCO—CH$_2$—CH$_2$—CH$_2$(CH$_3$)—CH$_2$—NHCO—
(11) —CONH—CH$_2$—CH$_2$—CH$_2$(CH$_3$)—CH$_2$—NHCO—
(12) —NHOC—CH$_2$—CH$_2$—CH$_2$(CH$_3$)—CH$_2$—CONH—

The polyamide resin used in the thermoplastic resin composition may be a polyamide resin having only a short chain structure. Specific examples thereof include nylon 6 (PA6, polyamide 6), nylon 66 (PA66, polyamide 66), nylon 46 (PA46, polyamide 46), and a copolymer of two or more of them. These olefins may be used singly or in combination of two or more of them.

Examples of the above-mentioned copolymer include nylon 6/66 (PA6/66, nylon 6/66) and the like. These olefins may be used singly or in combination of two or more of them.

The polyamide resin contained in the thermoplastic resin composition may have, in addition to the above-described short chain structure, a structure in which a hydrocarbon group interposed between adjacent amide bonds in a main chain is a phenylene group or a substituent thereof (hereinafter simply referred to as "phenylene structure") at the same time. The phenylene group (—C$_6$H$_4$—) is a residue obtained by removing two hydrogen atoms from benzene (C$_6$H$_6$), and may be any of a 1,2-phenylene group, a 1,3-phenylene group, and a 1,4-phenylene group. These olefins may be used singly or in combination of two or more of them. In the case of the substituent of the phenylene group (—C$_6$H$_3$(R)—), the number of main chain carbon atoms of a hydrocarbon group interposed between adjacent amide bonds in a main chain is 6 or more but 10 or less. That is, examples of the substituted phenylene group include a methylene phenylene group, a dimethylene phenylene group, and an ethylene phenylene group. These olefins may be used singly or in combination of two or more of them.

That is, the polyamide resin used in the thermoplastic resin composition may be a polyamide resin having only the short chain structure and the phenylene structure.

Specific examples of such a polyamide resin include nylon 6T (PA6T, polyamide 6T), nylon 6I (PA6I, polyamide 6I), nylon M5T (PAM5T, polyamide M5T), nylon M5I (PAM5I, polyamide M5I), and a copolymer of two or more of them. These olefins may be used singly or in combination of two or more of them.

Examples of the above-mentioned copolymer include nylon 6T/66 (PA6T/66, nylon 6T/66), nylon 6T/6I (PA6T/6I, polyamide 6T/6I), nylon 6T/6I/66 (PA6T/6I/66, polyamide 6T/6I/66), and nylon 6T/2M-5T (PA6T/2M-5T, polyamide 6T/2M-5T). These olefins may be used singly or in combination of two or more of them.

The polyamide resin used in the thermoplastic resin composition may be a polyamide resin having, in addition to the above-described short chain structure, the above-described structure having more than 5 straight chain carbon atoms (in the present invention, simply referred to as "long chain structure") at the same time. That is, a polyamide resin can be used whose polyamide molecules have only both the short chain structure and the long chain structure. Examples of such a polyamide resin having only both the short chain structure and the long chain structure include nylon 610 (PA610, polyamide 610), nylon 611 (PA611, polyamide 611), nylon 612 (PA612, polyamide 612), polyamide 614 (PA614, polyamide 614), and polyamide MXD6 (PAMXD6, polyamide MXD6). These polyamides may be used singly or in combination of two or more of them.

It is to be noted that when the polyamide resin used in the thermoplastic resin composition has only both the short chain structure and the long chain structure, the amount of the short chain structure contained in the polyamide resin is preferably more than 50% (more preferably 60% or more but 99% or less) of the total amount of the short chain structure and the long chain structure.

The number-average molecular weight of the polyamide resin contained in the thermoplastic resin composition is not particularly limited, but may be, for example, 5,000 or more but 100,000 or less, preferably 7,500 or more but 50,000 or less, more preferably 10,000 or more but 50,000 or less.

It is to be noted that the number-average molecular weight of the polyamide resin is determined by gel permeation chromatography (GPC) using polystyrene standards.

In the present invention, the use of the polyolefin resin having a large molecular weight (more specifically, the polyolefin resin having a number-average molecular weight of 350,000 or more) makes it possible to achieve higher impact resistance even when the polyamide resin has the above-described short chain structure. Particularly, when the short chain structure content of the polyamide resin is higher, a higher impact resistance-improving effect can be obtained.

More specifically, for example, when the thermoplastic resin composition using a polyolefin resin having a number-average molecular weight of 200,000 to 300,000 (non-high-molecular-weight PO) and the thermoplastic resin composition using a polyolefin resin having a number-average molecular weight of 350,000 or more (high-molecular-weight PO) are compared, the difference in impact resistance between them is larger when the short chain structure content of the polyamide resin is higher.

Therefore, when the polyamide resin used in the present invention virtually has only the short chain structure, the effect of the present invention can be made higher. That is, an extremely high impact resistance-improving effect can be obtained.

Further, when the polyamide resin used in the present invention has both the short chain structure and the phenylene structure or both the short chain structure and the long chain structure, the effect of the present invention can be made higher when the short chain structure content of the polyamide resin is higher.

More specifically, the ratio of the short chain structure to all the short chain structure (i.e., a short chain unit), the phenylene structure (i.e., a phenylene unit), and the long chain structure (i.e., a long chain unit) (the ratio of the number of the short chain units to the total number of all the units) is preferably more than 50%, more preferably 70% or more but 99% or less.

As will be described later, the thermoplastic resin composition can be obtained by, for example, melt-kneading the polyolefin resin with a melt-kneaded product of the inorganic filler-containing polyamide resin and the modified elastomer. When the case where PA11 is selected as the polyamide resin and the case where PA6 is selected as the polyamide resin are compared, the dispersion diameter (average dispersion diameter) of a dispersed phase (e.g., a dispersed phase $B_2$ shown in FIG. 1) in such a thermoplastic resin composition is larger when PA6 is selected than when PA11 is selected. The present inventor considered that the reason why such a difference in dispersion diameter occurs may be that a difference in the magnitude of contribution of a hydrogen bond between amide bonds (attractive interaction between a hydrogen atom constituting one amide bond and an oxygen atom constituting another amide bond) correlates with a difference in dispersion diameter. That is, in the case of the polyamide resin having a short chain structure, the amount of amide bonds in a polyamide molecule is relatively larger than that in a polyamide molecule of PA11 in which all the hydrocarbon groups each interposed between adjacent amide bonds in a main chain have 10 straight chain carbon atoms, and therefore hydrogen bonds between polyamide molecules are stronger. The present inventor considered that this makes it difficult to separate polyamide molecules from each other when a melt-kneaded product of the polyamide resin and the modified elastomer is melt-kneaded with the polyolefin resin so that the dispersion diameter of a dispersed phase dispersed in a continuous phase cannot be made sufficiently small (i.e., in, for example, FIG. 1, the dispersion diameter of a dispersed phase $B_2$ (polyolefin resin) dispersed in a continuous phase A (polyamide resin) cannot be made sufficiently small). Therefore, the present inventor considered that when the dispersion diameter of a dispersed phase in the thermoplastic resin composition cannot be made small, it is more difficult for the thermoplastic resin composition to obtain impact resistance-improving effect than when the dispersion diameter of a dispersed phase in the thermoplastic resin composition can be made small. However, the present inventor found that even when it is difficult to make the dispersion diameter of a dispersed phase in the thermoplastic resin composition small because the polyamide resin has a short chain structure, an interface formed between polyolefin molecules can be reduced by blending the polyolefin resin whose number-average molecular weight is controlled to be 350,000 or more, and as a result, the thermoplastic resin composition can achieve much more excellent impact resistance even when its dispersed phase has a relatively large dispersion diameter.

A monomer constituting the polyamide resin contained in the thermoplastic resin composition is not particularly limited, and may be one that can appropriately form the above-described short chain structure, phenylene structure, or long chain structure, if necessary.

Specific examples thereof include: amino acids such as 6-aminocaproic acid, 11-aminoundecanoic acid, 12-aminododecanoic acid, and paraaminomethylbenzoic acid; and lactams such as s-caprolactam, undecane lactam, and co-lauryl lactam. These olefins may be used singly or in combination of two or more of them.

Further, the polyamide resin may also be obtained by copolymerization of a diamine and a dicarboxylic acid. In this case, examples of the diamine as a monomer include: aliphatic diamines such as ethylenediamine, 1,3-diaminopropane, 1,4-diaminobutane, 1,6-diaminohexane, 1,7-diaminoheptane, 1,8-diaminooctane, 1, 9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl 1,8-diaminooctane; alicyclic diamines such as cyclohexanediamine and bis-(4-aminocyclohexyl)methane; and aromatic diamines such as xylylenediamines (e.g., p-phenylenediamine and m-phenylenediamine). These olefins may be used singly or in combination of two or more of them.

Examples of the dicarboxylic acid as a monomer include: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; alicyclic dicarboxylic acids such as cyclohexanedicarboxylic acid; and aromatic dicarboxylic acids such as phthalic acid, terephthalic acid, isophthalic acid, and naphthalenedicarboxylic acid. These olefins may be used singly or in combination of two or more of them.

(3) Inorganic Filler

The type of the inorganic filler is not particularly limited. Specific examples of the inorganic filler include: silicates (silicate minerals) such as talc, silica, clay, montmorillonite, and kaolin; carbonates such as calcium carbonate, lithium carbonate, and magnesium carbonate; hydroxides such as aluminum hydroxide and magnesium hydroxide; sulfides such as barium sulfate; metal oxides such as alumina, titanium oxide, and zinc oxide; titanides such as potassium titanate and barium titanate; metals such as aluminum, iron, silver, and copper; glass materials such as glass powder and glass fibers; carbides such as charcoal and bamboo charcoal; and carbons such as fullerene and carbon nanotubes. These inorganic fillers may be natural or artificial. These inorganic fillers may be used singly or in combination of two or more of them.

Among the above-mentioned inorganic fillers, silicates are preferred, and layered silicates are particularly preferred. A layered silicate is a silicate having a structure in which exchangeable cations are interposed between layered silicate layers. Examples of such a layered silicate include mica (e.g., white mica, fluorine mica, palagonite), montmorillonite, hectorite, vermiculite, and smectite. Among them, fluorine mica and montmorillonite are particularly preferred. Preferred examples of the exchangeable cation include alkali metal ions such as $Na^+$ and $Li^+$.

The thermoplastic resin composition according to the present invention preferably uses a layered silicate-containing polyamide resin in which silicate layers constituting a silicate are dispersed in a polyamide resin in a state where they are separated from each other. As the polyamide resin constituting the layered silicate-containing polyamide resin, the above-described polyamide resin can be used. The polyamide resin constituting the layered silicate-containing polyamide resin may be a polyamide resin having only a short chain structure, but a polyamide resin having both a short chain structure and a long chain structure can be used. That is, PA610, PA611, PA612, PA614, PAMXD6, or the like can be used.

In general, the polyamide resin constituting the layered silicate-containing polyamide resin (which is one example of the above-described polyamide resin composition containing an inorganic filler dispersed in advance) includes a polyamide resin having a short chain structure. Therefore, when a thermoplastic resin composition reinforced with an inorganic filler is obtained using such a layered silicate-containing polyamide resin, as described above, there is a problem that the impact resistance of the thermoplastic resin composition cannot be sufficiently improved because the dispersion diameter (average dispersion diameter) of a dispersed phase in the thermoplastic resin composition is not stable and tends to be large. However, since the polyolefin resin used in the thermoplastic resin composition according to the present invention has a number-average molecular weight of 350,000 or more, the dispersion diameter of a dispersed phase can be made small.

Further, when an inorganic filler is blended with a thermoplastic resin composition having a phase structure containing a continuous phase and a dispersed phase is obtained using a polyamide resin (inorganic filler-free polyamide resin), a polyolefin resin, and a modified elastomer, the mechanical properties of the thermoplastic resin composition are rather reduced as compared with when the inorganic filler is not blended. Although the reason for this is not clear, one of the causes for this is considered to be that the inorganic filler is arranged across the continuous phase and the dispersed phase. That is, it is considered that when the inorganic filler is arranged across the continuous phase and the dispersed phase, it is difficult for the phase separation structure to exert its effect.

On the other hand, it is considered that when the layered silicate-containing polyamide resin is used, the inorganic filler can stay in the continuous phase, and therefore can be prevented from being arranged across the continuous phase and the dispersed phase. Thus, it is considered that mechanical properties achieved by blending with the inorganic filler can be obtained without losing mechanical properties achieved by having the continuous phase and the dispersed phase. That is, a trade-off between stiffness and impact resistance is reduced in spite of the fact that the inorganic filler is blended, which makes it possible to obtain a thermoplastic resin composition having a good balance between impact resistance and stiffness.

The above-described effect is particularly excellent when the layered silicate and the polyamide resin have affinity for each other or bind together in the layered silicate-containing polyamide resin. Specific examples of such a layered silicate-containing polyamide resin include a polyamide resin containing a layered silicate subjected to affinity treatment (treatment performed to allow the layered silicate to have affinity for the polyamide resin) and a polyamide resin containing a layered silicate subjected to coupling treatment (treatment performed to allow the layered silicate to bind to the polyamide resin).

The layered silicate-containing polyamide resin may be obtained in any manner. For example, the layered silicate-containing polyamide resin can be obtained by polymerizing a monomer polymerizable to form a polyamide resin in a mixture of the monomer and a layered silicate.

The average dispersion diameter of the inorganic filler contained in the thermoplastic resin composition is not particularly limited. However, particularly when the inorganic filler is a layered silicate, the average dispersion diameter is preferably less than 1000 nm. The average dispersion diameter is more preferably 10 nm or more but 950 nm or less, even more preferably 30 nm or more but 500 nm or less, particularly preferably 50 nm or more but 250 nm or less.

The dispersion diameter of the inorganic filler is measured in the same manner as in the case of the dispersed phase. That is, the dispersion diameter of the inorganic filler can be measured using an electron microscope image enlarged 1000 times or more. More specifically, 20 particles of the inorganic filler are randomly selected from a predetermined region in the image, the longest diameter of each of the particles is measured, and an average of the measured longest diameters is determined as a first average value. Then, the first average values measured in 5 different regions in the image are further averaged to determine the average dispersion diameter (major-axis average dispersion diameter) of the inorganic filler.

(4) Modified Elastomer

The modified elastomer is an elastomer having a reactive group that reacts with the polyamide resin. The modified elastomer is preferably an elastomer having an affinity for the polyamide resin due to the above-described reactive group, and at the same time having an affinity also for the polyolefin resin. That is, the modified elastomer is preferably a compatibilizer that has a reactive group that reacts with the polyamide resin and that is compatible with both the polyolefin resin and the polyamide resin.

It is to be noted that the modified elastomer contained in the thermoplastic resin composition may be an unreacted modified elastomer, a reaction product with the polyamide resin, or both of them.

Examples of the reactive group include an acid anhydride group (—CO—O—OC—), a carboxyl group (—COOH), an epoxy group {—$C_2O$ (a three-membered ring structure composed of two carbon atoms and one oxygen atom)}, an oxazoline group (—$C_3H_4NO$), and an isocyanate group (—NCO). These olefins may be used singly or in combination of two or more of them.

These reactive groups can be introduced by modifying an elastomer before modification (unmodified elastomer). Specific examples of the modified elastomer include an acid-modified elastomer, an epoxy-modified elastomer, and an oxazoline-modified elastomer. Among them, an acid-modified elastomer is preferred, and an acid anhydride-modified elastomer or a carboxylic acid-modified elastomer is more preferred.

The modified elastomer particularly preferably has an acid anhydride group or a carboxyl group in the side chain or at the end of its molecule. The acid modification amount is not particularly limited. For example, the number of acid anhydride groups or carboxyl groups contained in one molecule of the modified elastomer is preferably 1 or more, more preferably 2 or more but 50 or less, even more preferably 3 or more but 30 or less, particularly preferably 5 or more but 20 or less.

These modified elastomers may be used singly or in combination of two or more of them.

Examples of the elastomer before modification include an olefin-based elastomer and a styrene-based elastomer. From the viewpoint of compatibility with the polyolefin resin, an olefin-based elastomer is particularly preferred.

Preferred examples of the olefin-based elastomer include α-olefin-based copolymers containing a structural unit derived from an α-olefin having 3 to 8 carbon atoms, such as an ethylene-α-olefin copolymer, an α-olefin copolymer, an α-olefin-non-conjugated diene copolymer, and an ethylene-α-olefin-non-conjugated diene copolymer. Among them, an ethylene-α-olefin copolymer, an α-olefin copolymer, and an ethylene-α-olefin-non-conjugated diene copolymer are particularly preferred.

Examples of the non-conjugated diene include: linear non-cyclic diene compounds such as 1,4-pentadiene, 1,4-hexadiene, 1,5-hexadiene, and 1,6-hexadiene; branched chain non-cyclic diene compounds such as 5-methyl-1,4-hexadiene, 3,7-dimethyl-1,6-octadiene, 5,7-dimethylocta-1,6-diene, 3,7-dimethyl-1,7-octadiene, 7-methyl-octa-1,6-diene, and dihydromyrcene; and alicyclic diene compounds such as tetrahydroindene, methyltetrahydroindene, dicyclopentadiene, bicyclo[2.2.1]-hepta-2,5-diene, 5-methylene-2-norbornene, 5-ethylidene-2-norbornene, 5-propenyl-2-norbornene, 5-isopropylidene-2-norbornene, 5-cyclohexylidene-2-norbornene, and 5-vinyl-2-norbornene.

Specific examples of the olefin elastomer include an ethylene-propylene copolymer, an ethylene-1-butene copolymer, an ethylene-1-pentene copolymer, an ethylene-1-hexene copolymer, an ethylene-1-octene copolymer, a propylene-1-butene copolymer, a propylene-1-pentene copolymer, a propylene-1-hexene copolymer, and a propylene-1-octene copolymer. Among them, an ethylene-propylene copolymer, an ethylene-1-butene copolymer, and an ethylene-1-octene copolymer are preferred.

Examples of the styrene-based elastomer include a block copolymer of an aromatic vinyl compound and a conjugated diene compound and a hydrogenated product thereof.

Examples of the aromatic vinyl compound include: styrene, alkylstyrenes such as α-methylstyrene, p-methylstyrene, and p-tert-butylstyrene, p-methoxystyrene, and vinylnaphthalene.

Examples of the conjugated diene compound include butadiene, isoprene, 1,3-pentadiene, methylpentadiene, phenylbutadiene, 3,4-dimethyl-1,3-hexadiene, and 4,5-diethyl-1,3-octadiene.

Specific examples of the styrene-based elastomer include a styrene-butadiene-styrene copolymer (SBS), a styrene-isoprene-styrene copolymer (SIS), a styrene-ethylene/butylene-styrene copolymer (SEBS), and a styrene-ethylene/propylene-styrene copolymer (SEPS).

Examples of the acid anhydride for acid modification include maleic anhydride, phthalic anhydride, itaconic anhydride, succinic anhydride, glutaric anhydride, adipic anhydride, citraconic anhydride, tetrahydrophthalic anhydride, and butenyl succinic anhydride. Among them, maleic anhydride, phthalic anhydride, and itaconic anhydride are preferred.

Examples of the carboxylic acid for acid modification include acrylic acid, methacrylic acid, maleic acid, fumaric acid, itaconic acid, and citraconic acid.

Among the above-mentioned various modified elastomers, the modified elastomer contained in the thermoplastic resin composition is preferably an acid anhydride-modified elastomer, particularly preferably a maleic anhydride-modified elastomer, more particularly preferably an acid-modified α-olefin-based copolymer containing a structural unit derived from an α-olefin having 3 to 8 carbon atoms. Specifically, maleic anhydride-modified elastomers are preferred, such as a maleic anhydride-modified ethylene-propylene copolymer, a maleic anhydride-modified ethylene-1-butene copolymer, a maleic anhydride-*modified ethylene-1-hexene copolymer, and a maleic anhydride-modified ethylene-1-octene copolymer. More specifically, for example, α-olefin copolymers "TAFMER series" (trade name) manufactured by Mitsui Chemicals, Inc. and "AMPLIFY series" (trade name) manufactured by The Dow Chemical Company can be used.

The weight-average molecular weight of the modified elastomer contained in the thermoplastic resin composition is not particularly limited, but may be, for example, 10,000 or more but 500,000 or less, preferably 20,000 or more but 500,000 or less, more preferably 30,000 or more but 300,000 or less.

It is to be noted that the weight-average molecular weight of the modified elastomer is determined by gel permeation chromatography (GPC) using polystyrene standards.

(5) Other Components

The thermoplastic resin composition may be composed of only the above-described thermoplastic resins, that is, the polyolefin resin (having a number-average molecular weight of 350,000 or more), the polyamide resin (having a short chain structure), and the modified elastomer without containing other thermoplastic resins, but may further contain other components. These olefins may be used singly or in combination of two or more of them.

One of the other components may be another thermoplastic resin. Specific examples of the another thermoplastic resin include a polyester-based resin (e.g., polybutylene terephthalate, polyethylene terephthalate, polycarbonate, polybutylene succinate, polyethylene succinate, polylactic acid) and a polyolefin resin having a number-average molecular weight of less than 350,000 (particularly, 150,000 or more but 300,000 or less). These olefins may be used singly or in combination of two or more of them.

When the thermoplastic resin composition contains another thermoplastic resin, the amount of the another thermoplastic resin is preferably 25% by mass or less (more preferably 20% by mass or less, even more preferably 15% by mass or less, even more preferably 10% by mass or less, even more preferably 5% by mass or less but 1% by mass or more) when the total mass of the polyolefin resin having a number-average molecular weight of 350,000 or more, the polyamide resin having a short chain structure, the modified elastomer, and the another thermoplastic resin is taken as 100%. It is to be noted that the polyolefin resin having a number average-molecular weight of less than 350,000 may be either a homopolymer or a copolymer, or may be both of them.

Examples of an additive that can be blended include an antioxidant, a heat stabilizer, a weathering agent, a light stabilizer, a plasticizer, an ultraviolet absorber, an antistatic agent, a flame retardant, a slip agent, an anti-blocking agent, an anti-fogging agent, a lubricant, a pigment, a dye, a dispersant, a copper inhibitor, a neutralizer, an anti-foaming agent, a weld strength improver, a natural oil, a synthetic oil, and a wax. These olefins may be used singly or in combination of two or more of them.

Examples of the antioxidant include a phenol-based compound, an organic phosphite-based compound, and a thio-ether-based compound.

Examples of the heat stabilizer include a hindered amine-based compound and the like.

Examples of the ultraviolet absorber include a benzophenone-based compound, a benzotriazole-based compound, and a benzoate-based compound.

Examples of the antistatic agent include a nonionic compound, a cationic compound, and an anionic compound.

Examples of the flame retardant include a halogen-based compound, a phosphorus-based compound (e.g., a nitrogen-containing phosphate compounds, a phosphate ester), a nitrogen-based compound (e.g., guanidine, triazine, melamine, or a derivative thereof), an inorganic compound (e.g., a metallic hydroxide, a boron-based compound, a silicone-based compound, a sulfur-based compound, and a red phosphorus-based compound.

If necessary, cellulose such as cellulose microfibrills or cellulose acetate; a fibrous filler such as glass fibers, polyethylene terephthalate fibers, nylon fibers, polyethylene terephthalate fibers, aramid fibers, vinylon fibers, or polyarylate fibers; or carbon such as fullerene or carbon nanotubes may further be blended.

<2> Phase Structure

The phase structure of the thermoplastic resin composition is not particularly limited as long as the thermoplastic resin composition contains the polyolefin resin, the inorganic filler-containing polyamide resin, and the modified elastomer, the polyolefin resin has a number-average molecular weight of 350,000 or more, and the polyamide resin has a short chain structure. However, as described above, it is considered that even when the dispersion diameter of a dispersed phase is large due to the use of the polyamide resin having a short chain structure, excellent impact resistance can be achieved by using the polyolefin resin having a number-average molecular weight of 350,000 or more. Therefore, the thermoplastic resin composition preferably has a continuous phase (A) containing the polyamide resin, a dispersed phase ($B_1$) dispersed in the continuous phase (A) and containing the modified elastomer, and the inorganic filler (C) dispersed in the continuous phase (A).

Further, the phase structure of the thermoplastic resin composition is not limited, but preferably has the following phase structure of (1) or (2).

Phase Structure of (1)

The phase structure of (1) is a phase structure that has a continuous phase (A) containing the polyamide resin, a dispersed phase ($B_1$) dispersed in the continuous phase (A) and containing the modified elastomer, a dispersed phase ($B_2$) dispersed in the continuous phase (A) and containing the polyolefin resin, and the inorganic filler (C) dispersed in the continuous phase (A) (see FIG. 1).

The phase structure of (1) does not have a continuous phase other than the continuous phase (A). Further, in the phase structure of (1), the modified elastomer may be an unreacted modified elastomer, a reaction product with the polyamide resin, or a mixture of them.

In this description, the "phase structure of (1)" is also simply referred to as "phase structure (1)".

The dispersed phase ($B_2$) in the phase structure (1) may or may not have a fine dispersed phase therein. When having a fine dispersed phase, the dispersed phase ($B_2$) may have a continuous phase ($B_{21}$) containing the polyolefin resin and a fine dispersed phase ($B_{22}$) dispersed in the continuous phase ($B_{21}$) and containing the polyamide resin (see FIG. 1). In this case, the phase structure (1) is a multi-phase structure in which the dispersed phase ($B_2$) further has the fine dispersed phase ($B_{22}$) therein. The fine dispersed phase ($B_{22}$) containing the polyamide resin may or may not contain the modified elastomer.

Phase Structure of (2)

The phase structure of (2) is a phase structure that has a continuous phase ($A_1$) containing the polyamide resin, a dispersed phase ($B_{41}$) dispersed in the continuous phase ($A_1$) and containing the modified elastomer, and the inorganic filler (C) dispersed in the continuous phase ($A_1$), and further has a continuous phase ($A_2$) containing the polyolefin resin, and a dispersed phase ($B_{A2}$) dispersed in the continuous phase ($A_2$) and containing the polyamide resin (see FIG. 2).

That is, the phase structure of (2) is a co-continuous phase structure in which two continuous phases, that is, the continuous phase ($A_1$) and the continuous phase ($A_2$) coexist. The dispersed phase ($B_{A2}$) containing the polyamide resin may or may not contain the modified elastomer.

It is to be noted that the phase structure of (2) does not have a continuous phase other than the continuous phase ($A_1$) and the continuous phase ($A_2$). Further, in the phase structure of (2), the modified elastomer may be an unreacted modified elastomer, a reaction product with the polyamide resin, or a mixture of them.

In this description, the "phase structure of (2)" is also simply referred to as "phase structure (2)".

The dispersed phase ($B_{A2}$) in the phase structure (2) may or may not have a fine dispersed phase therein. When having a fine dispersed phase, the dispersed phase ($B_{A2}$) may have a continuous phase ($B_{A21}$) containing the polyamide resin and a fine dispersed phase ($B_{A22}$) dispersed in the continuous phase ($B_{A21}$) and containing the modified elastomer (not shown). In this case, the phase structure (2) is a multi-phase structure in which the dispersed phase ($B_{A2}$) further has the fine dispersed phase ($B_{A22}$) therein.

In the phase structure (2), the modified elastomer may be an unreacted modified elastomer, a reaction product with the polyamide resin, or a mixture of them.

It is to be noted that the thermoplastic resin composition usually does not have the following phase structure of (3).

Phase Structure of (3)

The phase structure of (3) is a phase structure that has a continuous phase containing the polyolefin resin and a dispersed phase dispersed in the continuous phase and containing the polyamide resin and the modified elastomer but does not have a continuous phase containing the polyamide resin and a dispersed phase dispersed in the continuous phase and containing the polyolefin resin. That is, the phase structure of (3) has a continuous phase containing the polyolefin resin and a dispersed phase containing the polyamide resin, but is not a co-continuous phase structure.

In the case of the phase structure (1) (see FIG. 1), the continuous phase (A) contains the polyamide resin. The polyamide resin is preferably a main component of the continuous phase (A) (the amount of the polyamide resin is usually 70% by mass or more and may be 100% by mass with respect to the total amount of the continuous phase (A)). The dispersed phase ($B_1$) contains the modified elastomer. The modified elastomer is preferably a main component of the dispersed phase ($B_1$) (the amount of the modified elastomer is usually 70% by mass or more and may be 100% by mass with respect to the total amount of the dispersed phase $B_1$). The dispersed phase ($B_2$) contains the polyolefin resin. The polyolefin resin is preferably a main component of the disperse phase ($B_2$) (the amount of the polyolefin resin is usually 70% by mass or more and may be 100% by mass with respect to the total amount of the dispersed phase $B_2$). As described above, the dispersed phase ($B_2$) may contain the polyamide resin (as the dispersed phase ($B_{22}$)). When the dispersed phase ($B_2$) contains the polyamide resin, the amount of the polyamide resin may be less than 30% by mass with respect to the total amount of the dispersed phase $B_2$.

In the case of the phase structure (2), the continuous phase ($A_1$) contains the polyamide resin. The polyamide resin is preferably a main component of the continuous phase ($A_1$) (the amount of the polyamide resin is usually 70% by mass or more and may be 100% by mass with respect to the total amount of the continuous phase $A_1$). The dispersed phase ($B_{A1}$) dispersed in the continuous phase ($A_1$) contains the modified elastomer. The modified elastomer is preferably a main component of the dispersed phase ($B_{A1}$) (the amount of the modified elastomer is usually 70% by mass or more and may be 100% by mass with respect to the total amount of the dispersed phase $B_{A1}$).

Further, the continuous phase ($A_2$) contains the polyolefin resin. The polyolefin resin is preferably a main component of the continuous phase ($A_2$) (the amount of the polyolefin resin is usually 70% by mass or more and may be 100% by mass with respect to the total amount of the continuous phase $A_2$). The dispersed phase ($B_{A2}$) dispersed in the continuous phase ($A_2$) contains the polyamide resin. The polyamide resin is preferably a main component of the dispersed phase ($B_{A2}$) (the amount of the polyamide resin is usually 70% by mass or more and may be 100% by mass with respect to the total amount of the dispersed phase $B_{A2}$).

It is to be noted that, as described above, the dispersed phase ($B_{A2}$) may have a fine dispersed phase therein. In this case, the dispersed phase ($B_{A2}$) may have a continuous phase (continuous phase in dispersed phase) containing the polyamide resin and a fine dispersed phase (not shown) dispersed in the continuous phase and containing the modified elastomer. In this case, the phase structure (2) has a multi-phase structure in which the dispersed phase ($B_{A2}$) further has a fine dispersed phase therein. When the phase structure (2) has a multi-phase structure, the main component of the dispersed phase ($B_{A2}$) is preferably the polyamide resin (the amount of the polyamide resin is usually 70% by mass or more and may be 100% by mass with respect to the total amount of the dispersed phase $B_{A2}$). Further, the main component of the fine dispersed phase is preferably the modified elastomer (the amount of the modified elastomer is usually 70% by mass or more and may be 100% by mass with respect to the total amount of the fine dispersed phase).

When having such a phase structure (1) or phase structure (2), the thermoplastic resin composition has more excellent impact resistance. As will be described later, this phase structure can be obtained by melt-kneading the polyolefin resin and a melt-kneaded product of the inorganic filler-containing polyamide resin and the modified elastomer.

It is to be noted that in the thermoplastic resin composition, the polyamide resin and the modified elastomer may be reacted together. That is, the thermoplastic resin composition may contain a reaction product obtained by reacting the reactive group of the modified elastomer with the polyamide resin (reaction product between the polyamide resin and the modified elastomer). For example, in the phase structure (1), the above-described reaction product may be present at the interface between the continuous phase (A) and the dispersed phase ($B_2$) and/or the interface between the continuous phase ($B_{21}$) and the fine dispersed phase ($B_{22}$). Similarly, in the phase structure (2), the above-described reaction product may be present at the interface between the continuous phase ($A_1$) and the continuous phase ($A_2$) and the interface between the continuous phase ($A_2$) and the dispersed phase ($B_{A2}$).

Each of these various phase structures can be observed by observing, with a field-emission-type scanning electron microscope (FE-SEM), the surface of a test piece (test piece made of the thermoplastic resin composition) subjected to oxygen plasm etching treatment (e.g., oxygen plasma etching at 100 W for 1 min) and then to osmium coating treatment. In particular, the dispersed phase and the fine dispersed phase can be observed by observing an image enlarged 1000 times or more (usually 10,000 times or less) in such a manner as described above. Further, components constituting each of the phases can be identified by performing energy dispersive X-ray analysis (EDS) during observation using a field-emission-type scanning electron microscope (FE-SEM).

The size of the dispersed phase (the dispersed phase $B_2$ dispersed in the continuous phase A in FIG. 1 or the dispersed phase $B_{A2}$ dispersed in the continuous phase $A_2$ in FIG. 2) of the thermoplastic resin composition is not particularly limited, but the dispersion diameter (average dispersion diameter) of the dispersed phase is preferably 10000 nm or less, more preferably 50 nm or more but 8000 nm or less, even more preferably 100 nm or more but 4000 nm or less.

The dispersion diameter of the dispersed phase can be measured in an electron microscope image enlarged 1000 times or more. More specifically, 20 particles of the dispersed phase are randomly selected from a predetermined region in the image, the longest diameter of each of the particles was measured, and an average of the measured longest diameters is determined as a first average value. Then, the first average values measured in 5 different regions in the image are further averaged to determine the average dispersion diameter (major-axis average dispersion diameter) of the dispersed phase.

The size of the fine dispersed phase contained in the dispersed phase of the thermoplastic resin composition is not particularly limited, but the dispersion diameter (average dispersion diameter) of the fine dispersed phase is preferably 5 nm or more but 1000 nm or less, more preferably 5 nm or more but 600 nm or less, even more preferably 10 nm or more but 400 nm or less, particularly preferably 15 nm or more but 350 nm or less.

The dispersion diameter of the fine dispersed phase can be measured in an electron microscope image enlarged 1000 times or more. More specifically, 20 particles of the fine dispersed phase are randomly selected from a predetermined region in the image, the longest diameter of each of the particles was measured, and an average of the measured longest diameters is determined as a first average value. Then, the first average values measured in 5 different regions in the image are further averaged to determine the average dispersion diameter (major-axis average dispersion diameter) of the fine dispersed phase.

Further, the inorganic filler ($B_3$) contained in the thermoplastic resin composition usually inherits the properties (e.g., size and shape) of the inorganic filler itself described later. Therefore, the properties of the inorganic filler described later can be directly applied to the inorganic filler ($B_3$) contained in the thermoplastic resin composition.

<3> Formulation

When the total mass of the polyolefin resin (the polyolefin resin having a number-average molecular weight of 350,000 or more), the polyamide resin (the polyamide resin having a short chain structure), the modified elastomer, and the inorganic filler contained in the thermoplastic resin composition is taken as 100%, the ratio of the polyolefin resin may be 1% by mass or more but 90% by mass or less. The ratio of the polyolefin resin is preferably 2% by mass or more but 80% by mass or less, more preferably 3% by mass or more but 70% by mass or less, even more preferably 4% by mass or more but 60% by mass or less, even more preferably 5% by mass or more but 50% by mass or less, even more preferably 6% by mass or more but 40% by mass or less, even more preferably 7% by mass or more but 35% by mass or less, even more preferably 8% by mass or more but 30% by mass or less. When the ratio of the polyolefin resin is within the above range, it is possible to obtain a thermoplastic resin composition having excellent impact resistance and a molded body of such a thermoplastic resin composition.

When the total mass of the polyolefin resin (the polyolefin resin having a number-average molecular weight of 350,000 or more), the polyamide resin (the polyamide resin having a short chain structure), the modified elastomer, and the inorganic filler contained in the thermoplastic resin composition is taken as 100%, the ratio of the polyamide resin and the modified elastomer (part or all of which may be reacted together, the same applies hereinafter) may be 10% by mass or more but 99% by mass or less. The ratio of the polyamide resin and the modified elastomer is preferably 20% by mass or more but 99% by mass or less, more preferably 30% by mass or more but 98% by mass or less, even more preferably 40% by mass or more but 97% by mass or less, even more preferably 50% by mass or more but 96% by mass or less, even more preferably 60% by mass or more but 95% by mass or less, even more preferably 65% by mass or more but 94% by mass or less, even more preferably 70% by mass or more but 93% by mass or less.

When the ratio of the polyolefin resin is within the above range, it is possible to obtain a thermoplastic resin composition having excellent impact resistance and a molded body of such a thermoplastic resin composition.

When the total mass of the polyolefin resin (the polyolefin resin having a number-average molecular weight of 350,000 or more), the polyamide resin (the polyamide resin having a short chain structure), the modified elastomer, and the inorganic filler contained in the thermoplastic resin composition is taken as 100%, the ratio of the polyamide resin may be 1% by mass or more but 90% by mass or less. The ratio of the polyamide resin is preferably 15% by mass or more but 85% by mass or less, more preferably 20% by mass or more but 80% by mass or less, even more preferably 22% by mass or more but 76% by mass or less, even more preferably 25% by mass or more but 71% by mass or less, even more preferably 27% by mass or more but 68% by mass or less, even more preferably 29% by mass or more but 65% by mass or less, even more preferably 33% or more but 63% by mass or less. When the ratio of the polyolefin resin is within the above range, it is possible to obtain a thermoplastic resin composition having excellent impact resistance and a molded body of such a thermoplastic resin composition.

When the total mass of the polyolefin resin (the polyolefin resin having a number-average molecular weight of 350,000 or more), the polyamide resin (the polyamide resin having a short chain structure), the modified elastomer, and the inorganic filler contained in the thermoplastic resin composition is taken as 100%, the ratio of the inorganic filler may be 0.01% by mass or more but 25% by mass or less. The ratio of the inorganic filler is preferably 0.1% by mass or more but 20% by mass or less, more preferably 0.1% by mass or more but 15% by mass or less, even more preferably 0.2% by mass or more but 14% by mass or less, even more preferably 0.4% by mass or more but 13% by mass or less, even more preferably 0.6% by mass or more but 12% by mass or less, even more preferably 0.8% by mass or more but 10% by mass or less, even more preferably 1% by mass or more but 8% by mass or less. When the ratio of the polyolefin resin is within the above range, it is possible to obtain a thermoplastic resin composition having excellent impact resistance and a molded body of such a thermoplastic resin composition.

When the total mass of the polyolefin resin (the polyolefin resin having a number-average molecular weight of 350,000 or more), the polyamide resin (the polyamide resin having a short chain structure), the modified elastomer, and the inorganic filler contained in the thermoplastic resin composition is taken as 100%, the ratio of the modified elastomer may be 1% by mass or more but 60% by mass or less. The ratio of the modified elastomer is preferably 5% by mass or more but 53% by mass or less, more preferably 11% by mass or more but 45% by mass or less, even more preferably 12% by mass or more but 40% by mass or less, even more preferably 13% by mass or more but 38% by mass or less, even more preferably 14% by mass or more but 36% by mass or less, even more preferably 15% by mass or more but 35% by mass or less, even more preferably 18% by mass or more but 34% by mass or less. When the ratio of the polyolefin resin is within the above range, it is possible to obtain a thermoplastic resin composition having excellent impact resistance and a molded body of such a thermoplastic resin composition.

When the total mass of the polyolefin resin (the polyolefin resin having a number-average molecular weight of 350,000 or more) and the polyamide resin (the polyamide resin having a short chain structure) contained in the thermoplastic resin composition is taken as 100%, the ratio of the polyamide resin may be 30% by mass or more but 97% by mass or less. The ratio of the polyamide resin is preferably 35% by mass or more but 96% by mass or less, more preferably 37% by mass or more but 95% by mass or less, even more preferably 40% by mass or more but 94% by mass or less, even more preferably 43% by mass or more but 93% by mass or less, even more preferably 45% by mass or more but 92% by mass or less, even more preferably 47% by mass or more but 91% by mass or less, even more preferably 53% by mass or more but 90% by mass or less. When the ratio of the polyolefin resin is within the above range, it is possible to obtain a thermoplastic resin composition having excellent impact resistance and a molded body of such a thermoplastic resin composition.

When the total mass of the polyamide resin (the polyamide resin having a short chain structure) and the modified elastomer contained in the thermoplastic resin composition is taken as 100%, the ratio of the modified elastomer may be 10% by mass or more but 90% by mass or less. The ratio of the modified elastomer is preferably 15% by mass or more but 70% by mass or less, more preferably 20% by mass or more but 65% by mass or less, more preferably 22% by mass or more but 60% by mass or less, even more preferably 24% by mass or more but 55% by mass or less, even more preferably 26% by mass or more but 50% by mass or less, even more preferably 28% by mass or more but 45% by mass or less. When the ratio of the polyolefin resin is within the above range, it is possible to obtain a thermoplastic resin composition having excellent impact resistance and a molded body of such a thermoplastic resin composition.

When the total mass of the polyamide resin (the polyamide resin having a short chain structure) and the inorganic filler contained in the thermoplastic resin composition is taken as 100%, the ratio of the inorganic filler may be 0.001% by mass or more and 35% by mass or less. The ratio of the inorganic filler is preferably 0.1% by mass or more but 30% by mass or less, more preferably 1% by mass or more but 25% by mass or less, even more preferably 2% by mass or more but 20% by mass or less, even more preferably 3% by mass or more but 18% by mass or less, even more preferably 4% by mass or more but 15% by mass or less, even more preferably 5% by mass or more but 13% by mass or less. When the ratio of the polyolefin resin is within the above range, it is possible to obtain a thermoplastic resin composition having excellent impact resistance and a molded body of such a thermoplastic resin composition.

It is to be noted that in the case of the phase structure (1) (see FIG. 1), the ratio of the polyolefin resin when the total mass of the polyolefin resin (the polyolefin resin having a number-average molecular weight of 350,000 or more), the polyamide resin (the polyamide resin having a short chain structure), the modified elastomer, and the inorganic filler is taken as 100% is usually equal to the ratio of the continuous phase ($B_{21}$) in the dispersed phase ($B_2$) when the total mass of all the phases is taken as 100%. On the other hand, in the case of the phase structure (2) (see FIG. 2), the ratio of the polyolefin resin is usually equal to the ratio of the continuous phase ($A_2$) when the total mass of all the phases is taken as 100%.

Here, the ratio refers to the volume ratio, but the ratio of the polyolefin resin is usually equal also to the area ratio that reflects this volume ratio (the same applies hereafter).

In the case of the phase structure (1) (see FIG. 1), the ratio of the polyamide resin and the modified elastomer when the total mass of the polyolefin resin (the polyolefin resin having a number-average molecular weight of 350,000 or more), the polyamide resin (the polyamide resin having a short chain structure), the modified elastomer, and the inorganic filler is taken as 100% is usually equal to the total ratio of the continuous phase (A), the dispersed phase ($B_1$), and the fine dispersed phase ($B_{22}$) when the total mass of all the phases is taken as 100%. On the other hand, in the case of the phase structure (2) (see FIG. 2), the ratio of the polyamide resin and the modified elastomer is usually equal to the total ratio of the continuous phase ($A_1$), the dispersed phase ($B_{41}$), and the dispersed phase ($B_{42}$) when the total mass of all the phases is taken as 100%.

In the case of the phase structure (1) (see FIG. 1), the ratio of the polyamide resin when the total mass of the polyolefin resin (the polyolefin resin having a number-average molecular weight of 350,000 or more), the polyamide resin (the polyamide resin having a short chain structure), the modified elastomer, and the inorganic filler is taken as 100% is usually equal to the total ratio of the continuous phase (A) and the fine dispersed phase ($B_{22}$) when the total mass of all the phases is taken as 100%. On the other hand, in the case of the phase structure (2) (see FIG. 2), the ratio of the polyamide resin is usually equal to the total ratio of the continuous phase ($A_1$) and the dispersed phase ($B_{A2}$) when the total mass of all the phases is taken as 100%.

In the case of the phase structure (1) (see FIG. 1), the ratio of the modified elastomer when the total mass of the polyolefin resin (the polyolefin resin having a number-average molecular weight of 350,000 or more), the polyamide resin (the polyamide resin having a short chain structure), the modified elastomer, and the inorganic filler is taken as 100% is usually equal to the ratio of the dispersed phase ($B_1$) when the total mass of all the phases is taken as 100%. On the other hand, in the case of the phase structure (2) (see FIG. 2), the ratio of the modified elastomer is usually equal to the total ratio of the dispersed phase ($B_A$) when the total mass of all the phases is taken as 100%.

The thermoplastic resin composition can achieve both high impact resistance and high flexural modulus due to the addition of the inorganic filer and the use of the polyamide resin having a short chain structure. More specifically, the thermoplastic resin composition can achieve both a Charpy impact strength of 50 kJ/m$^2$ or more but 190 kJ/m$^2$ or less and a flexural modulus of 500 MPa or more but 1500 MPa or less. The Charpy impact strength can further be set to 65 kJ/m$^2$ or more but 190 kJ/m$^2$ or less, further to 70 kJ/m$^2$ or more but 180 kJ/m$^2$ or less, further to 75 kJ/m$^2$ or more but 170 kJ/m$^2$ or less, further to 80 kJ/m$^2$ or more but 160 kJ/m$^2$ or less, and further to 85 kJ/m$^2$ or more but 150 kJ/m$^2$ or less. On the other hand, the flexural modulus can further be set to 550 MPa or more but 1450 MPa or less, further to 600 MPa or more but 1400 MPa or less, further to 650 MPa or more but 1350 MPa or less, further to 700 MPa or more but 1300 MPa or less, and further to 750 MPa or more but 1250 MPa or less.

[2] Molded Body

A molded body according to the present invention is composed of the thermoplastic resin composition. The thermoplastic resin composition is as described above. The molded body may be either a solid molded body or a foamed molded body. The molded body may be formed in any manner, and a method for forming the molded body is not particularly limited. Examples of the method include injection molding, extrusion molding (sheet extrusion, profile extrusion), T-die molding, blow molding, injection blow molding, inflation molding, hollow molding, vacuum molding, compression molding, press molding, stamping molding, and transfer molding. These olefins may be used singly or in combination of two or more of them.

Further, the shape and dimensions, such as size and thickness, of the molded body are not particularly limited, and the intended use of the molded body is not particularly limited, either. This molded body can be used as, for example, an exterior material, interior material, structural material, or impact absorber for automobiles, railway vehicles, ships, and airplanes. Examples of an automobile part using the molded body include exterior materials for automobiles, interior materials for automobiles, structural materials for automobiles, and impact absorbers for automobiles, and components in engine rooms. Specific examples thereof include bumpers, spoilers, cowlings, front grilles, garnishes, bonnets, trunk lids, cowl louvers, fender panels, rocker moldings, door panels, roof panels, instrument panels, center clusters, door trims, quarter trims, roof linings, pillar garnishes, deck trims, tonneau boards, package trays, dashboards, console boxes, kicking plates, switch bases, seat back boards, seat frames, arm rests, sun visors, intake manifolds, engine head covers, engine under covers, oil filter housings, housings for car electronic parts (e.g., ECU, TV monitors), and air filter boxes.

Further, the molded body can also be used as, for example, an interior material, exterior material, or structural material for buildings and furniture. Specific examples thereof include door covering materials, door structural materials, and front covering materials and structural materials for various pieces of furniture (e.g., desks, chairs, shelves, chests). Further, the molded body can also be used as, for example, a packing material, a container (e.g., a tray), a protecting member, or a partitioning member. Further, the molded body can also be used as, for example, a housing or structure for household machines (e.g., flat-panel TV monitors, refrigerators, washing machines, cleaners, mobile phones, portable game devices, laptop computers).

[3] Method for Producing Thermoplastic Resin Composition

A method for producing the above-described thermoplastic resin composition includes
the step of melt-kneading a polyolefin resin (polyolefin resin having a number-average molecular weight of 350,000 or more) and a melt-kneaded product of an inorganic filler-containing polyamide resin (polyamide resin having a short chain structure) and a modified elastomer (modified elastomer having a reactive group that reacts with the polyamide resin).

It is to be noted that the properties of each of the polyolefin resin, the inorganic filler-containing polyamide resin, and the modified elastomer, and the formulation of these components are as described above. Further, the inorganic filler and the polyamide resin constituting the inorganic filler-containing polyamide resin are also as described above.

The melt-kneading step (hereinafter simply referred to as "second melt-kneading step") is the step of melt-kneading a melt-kneaded product and a polyolefin resin (polyolefin resin having a number-average molecular weight of 350,000 or more).

The melt-kneaded material used in this case may be a composition in a molten state or a softened state or a solidified composition obtained by, for example, pelletization.

In the second melt-kneading step, any melt-kneading apparatus may be used. Examples of a usable melt-kneading apparatus include an extruder (e.g., a single-screw extruder, a twin-screw extruder), a kneader, and a mixer (e.g., a high-speed flow mixer, a paddle mixer, a ribbon mixer). These apparatuses may be used singly or in combination of two or more of them. When two or more apparatuses are used, they may be operated continuously or in a batch manner. Further, the raw materials may be mixed at a time, or may be added in several batches (multistage addition).

The kneading temperature in the second melt-kneading step is not particularly limited, but is preferably 190° C. or higher but 350° C. or lower, more preferably 200° C. or higher but 300° C. or lower, even more preferably 205° C. or higher but 260° C. or lower.

The melt-kneaded product is a composition obtained by previously melt-kneading an inorganic filler-containing polyamide resin (polyamide resin having a short chain structure) and a modified elastomer (modified elastomer having a reactive group that reacts with the polyamide resin). Hereinafter, this step of previously melt-kneading a polyamide resin and a modified elastomer is referred to as "first melt-kneading step".

In this first melt-kneading step, melt kneading may be performed in any manner. A specific example of a method for obtaining the melt-kneaded product is a method (1) in which only an inorganic filler-containing polyamide resin and a modified elastomer are melt-kneaded. Another specific example of a method for obtaining the melt-kneaded product is a method (2) in which an inorganic filler-containing polyamide resin, a polyamide resin containing no inorganic filler, and a modified elastomer are melt-kneaded.

Among them, the method (2) is preferred. When the method (2) is used, such an inorganic filler-containing polyamide resin as described above can be used in which an inorganic filler and a polyamide resin have affinity for each other or bind together. More specifically, a layered silicate-containing polyamide resin can be used in which a layered silicate and a polyamide resin have affinity for each other or bind together. This makes it possible to prevent the inorganic filler from being arranged across the continuous phase (A) and the dispersed phase (B) and therefore to more reliably allow the inorganic filler to stay in the dispersed phase (B).

When the method (2) is used, the order of kneading the components is not limited. That is, for example, the inorganic filler-containing polyamide resin, the inorganic filler-free polyamide resin, and the modified elastomer may be melt-kneaded at the same time, or the modified elastomer may be added to and kneaded with a previously-prepared melt-kneaded product of the inorganic filler-containing polyamide resin and the inorganic filler-free polyamide resin.

When the inorganic filler-containing polyamide resin is used, the polyamide resin constituting the inorganic filler-containing polyamide resin and the polyamide resin containing no inorganic filler (inorganic filler-free polyamide resin) may be the same or different from each other.

When the inorganic filler-containing polyamide resin is used, the amount of the inorganic filler contained in the inorganic filler-containing polyamide resin is not limited as long as the above-described blending ratio of the inorganic filler (described in detail in "<3> Formulation") is finally achieved.

In the first melt-kneading step, any melt-kneading apparatus may be used. The various apparatuses exemplified above with reference to the second melt-kneading step may be used. These apparatuses may be used singly or in combination of two or more of them. The apparatus used in the first melt-kneading step and the apparatus used in the second melt-kneading step may be the same or different from each other.

When two or more apparatuses are used, they may be operated continuously or in a batch manner. Further, the raw materials may be mixed at a time, or may be added in several batches (multistage addition).

Further, the kneading temperature in the first melt-kneading step is preferably 190° C. or higher but 350° C. or lower, more preferably 200° C. or higher but 330° C. or lower, even more preferably 205° C. or higher but 310° C. or lower.

In the production method, a previously-prepared melt-kneaded product (melt kneaded product of the inorganic filler, the polyamide resin, and the modified elastomer) is used, and therefore kneading is performed when the polyamide resin and the modified elastomer react with each other. Therefore, it is considered that due to the modified elastomer having a reactive group, the reactive group is attached to the surface of the polyamide resin so that polyamide resin particles having the modified elastomer reactant bound to the surfaces thereof are formed. By further performing kneading, the polyamide resin particles having the modified elastomer reactant bound to the surfaces thereof are sheared, and the surface of the unreacted polyamide resin appears. Then, it is considered that the unreacted modified elastomer further reacts with the unreacted surface. Therefore, it is considered that smaller polyamide resin particles binding with the modified elastomer reactant can be stably formed without relying on a high shear by repeating the shearing of polyamide resin particles binding with the modified elastomer reactant to allow the unreacted surface of the polyamide resin to appear and the reaction of the unreacted surface with the unreacted modified elastomer.

It is considered that if the amount of the modified elastomer that can be supplied in the above process is small, it is difficult to make the polyamide resin particles binding with the modified elastomer reactant small, and when the amount of the modified elastomer that can be supplied in the above process is sufficiently large, it is easy to make the polyamide resin particles binding with the modified elastomer reactant small.

EXAMPLES

Hereinafter, the present invention will be specifically described with reference to examples.

[1] Preparation of Thermoplastic Resin Composition and Preparation of Test Pieces <1> Preparation of Thermoplastic Resin Composition Thermoplastic resin compositions of Experimental Examples 1 to 7 were prepared so as to have formulations shown in Table 1.

[1] Experimental Example 1 (Reference Sample)

Pellets of a polyamide resin (1) (inorganic filler-free polyamide resin) described later and pellets of a modified elastomer described later were dry-blended, fed into a twin-screw melt-kneading extruder (manufactured by Coperion, screw diameter: 50 mm, L/D=48), and melt-kneaded under conditions of a kneading temperature of 210° C., an extrusion speed of 150 kg/hr, and a screw rotation speed of 500 rpm (first melt-kneading step) to obtain a melt-kneaded product of the polyamide resin and the modified elastomer, and pellets of the melt-kneaded product were obtained by a pelletizer.

Then, the thus obtained pellets and pellets of a polyolefin resin (1) described later were dry-blended, fed into the twin-screw melt-kneading extruder (manufactured by Coperion, screw diameter: 50 mm, L/D=48), and melt-kneaded under conditions of a kneading temperature of 210° C., an extrusion speed of 150 kg/hr, and a screw rotation speed of 500 rpm (second melt-kneading step) to obtain a thermoplastic resin composition of Experimental Example 1, and pellets of the thermoplastic resin composition were obtained by the pelletizer.

[2] Experimental Examples 2 and 3 (Invention)

Pellets of an inorganic filler-containing polyamide resin described later, pellets of a polyamide resin (inorganic filler-free polyamide resin) described later, and pellets of a modified elastomer described later were dry-blended and then subjected to the first melt-kneading step under the same conditions as in Experimental Example 1 to obtain a melt-kneaded product of the inorganic filler, the polyamide resin, and the modified elastomer, and pellets of the melt-kneaded product were obtained by a pelletizer. Then, the thus obtained pellets and pellets of a polyolefin resin (1) described later were dry-blended and then subjected to the second melt-kneading step under the same conditions as in Experimental Example 1 to obtain a thermoplastic resin composition of Experimental Example 2 or 3, and pellets of the thermoplastic resin composition were obtained by a pelletizer.

[3] Experimental Example 4 (Reference Sample)

Pellets of a polyamide resin (inorganic filler-free polyamide resin) described later and pellets of a modified elastomer described later were dry-blended and then subjected to the first melt-kneading step under the same conditions as in Experimental Example 1 to obtain a melt-kneaded product of the polyamide resin and the modified elastomer, and pellets of the melt-kneaded product were obtained by a pelletizer. Then, the thus obtained pellets and pellets of a polyolefin resin (2) described later were dry-blended and then subjected to the second melt-kneading step under the same conditions as in Experimental Example 1 to obtain a thermoplastic resin composition of Experimental Example 4, and pellets of the thermoplastic resin composition were obtained by the pelletizer.

[4] Experimental Example 5 (Reference Sample)

Pellets of an inorganic filler-containing polyamide resin described later and pellets of a modified elastomer described later were dry-blended and then subjected to the first melt-kneading step under the same conditions as in Experimental Example 1 to obtain a melt-kneaded product of the inorganic filler, the polyamide resin, and the modified elastomer, and pellets of the melt-kneaded product were obtained by a pelletizer. Then, the thus obtained pellets and pellets of a polyolefin resin (2) described later were dry-blended and then subjected to the second melt-kneading step under the same conditions as in Experimental Example 1 to obtain a thermoplastic resin composition of Experimental Example 5, and pellets of the thermoplastic resin composition were obtained by the pelletizer.

[5] Experimental Example 6 (Reference Sample)

Pellets of a polyamide resin (inorganic filler-free polyamide resin) described later and pellets of a modified elastomer described later were dry-blended and then subjected to the first melt-kneading step under the same conditions as in Experimental Example 1 to obtain a melt-kneaded product of the polyamide resin and the modified elastomer, and pellets of the melt-kneaded product were obtained by a pelletizer. Then, the thus obtained pellets and pellets of a polyolefin resin (1) described later were dry-blended and then subjected to the second melt-kneading step under the same conditions as in Experimental Example 1 to obtain a thermoplastic resin composition of Experimental Example 6, and pellets of the thermoplastic resin composition were obtained by the pelletizer.

[6] Experimental Example 7 (Reference Sample)

Pellets of a polyamide resin (inorganic filler-free polyamide resin) described later and pellets of a modified elastomer described later were dry-blended and then subjected to the first melt-kneading step under the same conditions as in Experimental Example 1 to obtain a melt-kneaded product of the polyamide resin and the modified elastomer, and pellets of the melt-kneaded product were obtained by a pelletizer. Then, the thus obtained pellets and pellets of a polyolefin resin (2) described later were dry-blended and then subjected to the second melt-kneading step under the same conditions as in Experimental Example 1 to obtain a thermoplastic resin composition of Experimental Example 7, and pellets of the thermoplastic resin composition were obtained by the pelletizer.

Polyolefin resin (1): polypropylene resin, homopolymer, number-average molecular weight 520,000, MFR 3 g/10 min Polyolefin resin (2): polypropylene resin, homopolymer, number-average molecular weight 312,000, MFR 21 g/10 min Polyamide resin (inorganic filler-free polyolefin resin): Nylon 6 resin (polyamide resin having only a short chain structure), number-average molecular weight 18,000

Inorganic filler-containing polyolefin resin: Nylon 6 resin (polyamide resin having only a short chain structure) manufactured by UNITIKA LTD. under the trade name of "NANOCON M1030DH(N)", number-average molecular weight 20,000, containing a layered silicate as an inorganic filler, inorganic filler content 10% by mass Modified elastomer: maleic anhydride-modified ethylene-butene copolymer (modified EBR), manufactured by Mitsui Chemicals, Inc. under the trade name of "TAFMER MH7020", MFR (230° C.)=1.5 g/10 min distance (L) between which was 64 mm, and a load was put at 2 mm/min on a point of action (curvature radius: 5 mm) located at the center between the two supporting points.

<3> Morphology Observation

The fracture surface of each of the test pieces subjected to the Charpy impact strength measurement (1) was treated by oxygen plasma etching at 100 W for 1 minute, coated with osmium, and observed with a field-emission-type scanning electron microscope ("JSM-7100F TTL LV" manufactured by JEOL Ltd.) to obtain an image (FE-SEM image). The components constituting each phase were identified by energy dispersive X-ray analysis (EDS) during the above-described observation with FE-SEM. From these results, the phase structure was determined. As a result, Experimental Examples 2 and 3 had the phase structure (1).

[3] Effects of Examples

A comparison between Experimental Example 6 (Reference Sample) and Experimental Example 7 (Reference Sample) shows that impact resistance greatly varies depending on the number-average molecular weight of the polyolefin resin used. More specifically, as shown in Experimental Example 7, when polypropylene having a number-average molecular weight of 312,000 is used as the

TABLE 1

| | | Experimental Examples | | | | | | |
|---|---|---|---|---|---|---|---|---|
| | | 1 | 2 | 3 | 4 | 5 | 6 | 7 |
| Polypropylene | Mn = 520,000 | | 10 | | — | | 55 | — |
| (homopolymer) | Mn = 312,000 | | — | | 32.5 | | — | 55 |
| Polyamide | PA6 | 60 | 30 | — | 42.5 | — | 25 | |
| Inorganic filler-containing polyamide | PA6 + Layered silicate | — | 30 (PA/27) (FL/3) | 60 (PA/54) (FL/6) | — | 42.5 (PA/38.25) (FL/4.25) | | |
| Modified elastomer | Maleic anhydride-modified EBR | | 30 | | 25 | | 20 | |
| Charpy impact strength (kJ/m$^2$) | | 121 | 117 | 124 | 76 | 63 | 84 | 23 |
| Elastic modulus (MPa) | | 901 | 937 | 1088 | 1100 | 1200 | — | |

It is to be noted that in Table 1, "PA" and "FL" in the column "Inorganic filler-containing polyamide" indicate the ratio of the polyamide resin contained in the inorganic filler-containing polyamide and the ratio of the inorganic filler contained in the inorganic filler-containing polyamide, respectively.

<2> The pellets obtained above in <1> were fed into an injection molding machine (manufactured by NISSEI PLASTIC INDUSTRIAL CO., LTD., 40-ton injection molding machine) and subjected to injection molding under conditions of a preset temperature of 210° C. and a mold temperature of 40° C. to obtain test pieces for evaluation (Experimental Examples 1 to 7).

[2] Evaluation of Test Pieces

<1> Measurement of Charpy Impact Strength

Charpy impact strength was measured in accordance with JIS K 7111-1 using the test pieces of Experimental Examples 1 to 7 obtained above in [2]. The results are shown in Table 1. It is to be noted that in this measurement of Charpy impact strength, the impact strength of a test piece having a notch (type A) was measured by an edgewise test method at 23° C.

<2> Measurement of Flexural Modulus

Flexural modulus was measured in accordance with JIS K 7171 using the test pieces of Experimental Examples 1 to 5 obtained above in [2]. The results are shown as "Elastic modulus" in Table 1. The flexural modulus was measured in the following manner. Each of the test pieces was supported by two supporting points (curvature radius: 5 mm) the polyolefin resin, and PA6 (polyamide resin having only a short chain structure) is used as the polyamide resin, the Charpy impact strength is 23 kJ/m$^2$, but as shown in Experimental Example 6, when polypropylene having a number-average molecular weight of 520,000 is used as the polyolefin resin, the Charpy impact strength is significantly improved to 84 kJ/m$^2$.

Further, as shown in Experimental Example 4 (Reference Sample), when polypropylene having a number-average molecular weight of 312,000 is used as the polyolefin resin, and PA6 (polyamide resin having only a short chain structure) is used as the polyamide resin to achieve a flexural modulus of about 1000 MPa as a mechanical property, the Charpy impact strength is 76 kJ/m$^2$.

However, as shown in Experimental Example 1 (Reference Sample), when polypropylene having a number-average molecular weight of 520,000 is used as the polyolefin resin, and PA6 (polyamide resin having only a short chain structure) is used as the polyamide resin in order to achieve a flexural modulus of about 1000 MPa as a mechanical property, the Charpy impact strength can be improved to 121 kJ/m$^2$.

That is, Experimental Example 4 is inferior in balance between impact strength and stiffness to Experimental Example 1 using polypropylene having a number-average molecular weight of 520,000 as the polyolefin resin.

A comparison of Experimental Example 5 (Reference Sample) with Experimental Example 4 (Reference Sample)

shows that the flexural modulus can be improved by adding the inorganic filler, but on the contrary, the impact strength is reduced, that is, a trade-off between impact resistance and flexural modulus occurs. In particular, the trade-off occurs in spite of the fact that all the inorganic filler used in Experimental Example 5 is dispersed in the polyamide resin in advance.

On the other hand, as shown in Experimental Example 1 (Reference Sample), when polypropylene having a number-average molecular weight of 520,000 is used as the polyolefin resin, and PA6 (polyamide resin having only a short chain structure) is used as the polyamide resin to achieve a flexural modulus of about 1000 MPa as a mechanical property, a Charpy impact strength of 121 kJ/m$^2$ and a flexural modulus of 901 MPa are achieved as mechanical properties.

Further, as shown in Experimental Example 2 (Invention), when the inorganic filler-containing polyamide resin (whose polyamide resin is PA6 having only a short chain structure) is used instead of part of the polyamide resin used in Example 1, a Charpy impact strength of 117 kJ/m$^2$ and a flexural modulus of 937 MPa are achieved as mechanical properties. This shows that slight addition of the inorganic filler makes it possible to improve the flexural modulus with little change in impact strength.

Further, as shown in Experimental Example 3 (Invention), when the amount of the inorganic filler-containing polyamide resin (whose polyamide resin is PA6 having only a short chain structure) is increased, a Charpy impact strength of 124 kJ/m$^2$ and a flexural modulus of 1088 MPa are achieved as mechanical properties, that is, both the impact resistance and flexural modulus can be improved at the same time without the occurrence of a trade-off between them.

The foregoing examples are for illustrative purposes only and are in no way to be construed as limiting of the present invention. While the present invention has been described with reference to exemplary embodiments, it is understood that the words which have been used herein are words of description and illustration, rather than words of limitation. Changes may be made within the purview of the appended claims without departing from the scope and spirit of the present invention in its aspects. Although the present invention has been described herein with reference to particular structures, materials, and embodiments, the present invention is not intended to be limited to the particulars disclosed herein; rather, the present invention extends to all functionally equivalent structures, methods, and uses, such as are within the scope of the appended claims.

REFERENCE SIGNS LIST

A Continuous phase
$B_1$ Dispersed phase
$B_2$ Dispersed phase
$B_{21}$ Continuous phase (Continuous phase in dispersed phase $B_2$)
$B_{22}$ Fine dispersed phase (Dispersed phase in dispersed phase $B_2$)
$A_1$, $A_2$ Continuous phase
$B_{A1}$, $B_{A2}$ Dispersed phase
C Inorganic filler

The invention claimed is:

1. A thermoplastic resin composition obtained by blending a polyolefin resin, a polyamide resin containing an inorganic filler, and a modified elastomer having a reactive group that reacts with the polyamide resin, wherein
the polyolefin resin is a propylene homopolymer and the propylene homopolymer has a number-average molecular weight of 500,000 or more,
the polyolefin resin has no reactive group that reacts with the polyamide resin,
the polyamide resin is a polyamide 6,
the inorganic filler is a layered silicate which has silicate layers,
the silicate layers and the polyamide resin have affinity for each other or bind together, and
the modified elastomer is a maleic anhydride-modified ethylene-butene copolymer.

2. The thermoplastic resin composition according to claim 1, further comprising:
a continuous phase (A) containing the polyamide resin,
a dispersed phase ($B_1$) containing the modified elastomer, wherein the dispersed phase ($B_1$) is dispersed in the continuous phase (A),
a dispersed phase ($B_2$) containing the polyolefin resin, wherein the dispersed phase ($B_2$) is dispersed in the continuous phase (A), and
the inorganic filler (C) is dispersed in the continuous phase (A).

3. A molded body comprising the thermoplastic resin composition according to claim 1.

4. A method for producing the thermoplastic resin composition according to claim 1, comprising:
melt-kneading the polyolefin resin and a melt-kneaded product of the polyamide resin containing an inorganic filler and the modified elastomer.

5. The thermoplastic resin composition according to claim 1, wherein the polyolefin resin has a number-average molecular weight of 520,000 or more.

6. The thermoplastic resin composition according to claim 1, wherein the thermoplastic resin composition is obtained by melt-kneading a melt-kneaded product and the polyolefin resin,
wherein the melt-kneaded product is obtained by melt-kneading the polyamide resin and the modified elastomer.

7. A thermoplastic resin composition comprising a polyolefin resin, a polyamide resin containing an inorganic filler, and a modified elastomer having a reactive group that reacts with the polyamide resin, wherein
the polyolefin resin is a propylene homopolymer and the propylene homopolymer has a number-average molecular weight of 500,000 or more,
the polyolefin resin has no reactive group that reacts with the polyamide resin,
the polyamide resin is a polyamide 6,
the inorganic filler is a layered silicate which has silicate layers,
the silicate layers and the polyamide resin have affinity for each other or bind together, and
the modified elastomer is a maleic anhydride-modified ethylene-butene copolymer.

* * * * *